US011341485B2

(12) United States Patent
Kursun

(10) Patent No.: US 11,341,485 B2
(45) Date of Patent: May 24, 2022

(54) MACHINE LEARNING BASED SYSTEM FOR AUTHORIZATION OF AUTONOMOUS RESOURCE TRANSFERS BETWEEN DISTRIBUTED IOT COMPONENTS

(71) Applicant: Bank of America Corporation, Charlotte, NC (US)

(72) Inventor: Eren Kursun, New York, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 433 days.

(21) Appl. No.: 16/532,895

(22) Filed: Aug. 6, 2019

(65) Prior Publication Data

US 2021/0042736 A1 Feb. 11, 2021

(51) Int. Cl.
G06Q 20/36 (2012.01)
G06Q 20/40 (2012.01)
G06N 20/00 (2019.01)

(52) U.S. Cl.
CPC ......... G06Q 20/3678 (2013.01); G06N 20/00 (2019.01); G06Q 20/3672 (2013.01); G06Q 20/405 (2013.01)

(58) Field of Classification Search
None
See application file for complete search history.

(56) References Cited

U.S. PATENT DOCUMENTS

| 9,372,922 | B2 | 6/2016 | Shaashua et al. |
| 9,451,462 | B2 | 9/2016 | Kim et al. |
| 9,461,976 | B1 | 10/2016 | Smith et al. |
| 9,729,383 | B2 | 8/2017 | Sundaresan et al. |
| 9,729,528 | B2 | 8/2017 | Zakaria et al. |
| 9,860,221 | B2 | 1/2018 | Smith |
| 9,871,865 | B2 | 1/2018 | Shaashua et al. |
| 9,872,240 | B2 | 1/2018 | Kim et al. |
| 9,918,351 | B2 | 3/2018 | Kim et al. |
| 9,961,572 | B2 | 5/2018 | Foster et al. |
| 9,977,415 | B2 | 5/2018 | Zimmerman et al. |
| 10,045,150 | B2 | 8/2018 | Zakaria |
| 10,055,869 | B2 | 8/2018 | Borrelli et al. |
| 10,055,966 | B2 | 8/2018 | Foster et al. |
| 10,075,339 | B2 | 9/2018 | Bandyopadhyay et al. |

(Continued)

*Primary Examiner* — Neha Patel
*Assistant Examiner* — Nicholas K Phan
(74) *Attorney, Agent, or Firm* — Moore & Van Allen PLLC; Anupshrinivasan Iyer

(57) ABSTRACT

Systems, computer program products, and methods are described herein for machine learning based system for authorization of autonomous resource transfers between distributed IoT components. The present invention is configured to receive, from a first autonomous IoT device, a transaction authorization request to execute a transaction with a second autonomous IoT device; receive information associated with the first autonomous IoT device, information associated with the second autonomous IoT device, and information associated with the transaction; initiate an execution of one or more machine learning algorithms; determine that the first autonomous IoT device is authorized to execute the transaction with the second autonomous IoT device; transmit a transaction authorization to the first autonomous IoT device to execute the transaction; and receive, from the first autonomous IoT device, an indication that the transaction has been executed.

18 Claims, 8 Drawing Sheets

(56) References Cited

U.S. PATENT DOCUMENTS

| | | |
|---|---|---|
| 10,079,874 B2 | 9/2018 | Jung et al. |
| 10,175,666 B2 | 1/2019 | Baez et al. |
| 10,291,549 B2 | 5/2019 | Hayashi et al. |
| 10,291,595 B2 | 5/2019 | Britt et al. |
| 10,419,877 B2 | 9/2019 | Um et al. |
| 10,423,608 B2 | 9/2019 | Kapoor et al. |
| 10,469,464 B2 | 11/2019 | Smith |
| 10,529,008 B1 | 1/2020 | Pritchard et al. |
| 11,140,159 B2 * | 10/2021 | Wang .................... H04L 9/3231 |
| 2009/0070171 A1 | 3/2009 | Patterson |
| 2014/0164229 A1 | 6/2014 | Jones et al. |
| 2016/0065653 A1 | 3/2016 | Chen et al. |
| 2016/0128043 A1 | 5/2016 | Shuman et al. |
| 2016/0379163 A1 | 12/2016 | Johanson et al. |
| 2017/0093861 A1 | 3/2017 | Kesavan et al. |
| 2018/0033011 A1 | 2/2018 | Bhattacharjee et al. |
| 2018/0260872 A1 | 9/2018 | Ali |
| 2019/0066111 A1 | 2/2019 | Bizarro et al. |
| 2019/0158482 A1 * | 5/2019 | Wang .................... H04W 12/33 |
| 2019/0258804 A1 * | 8/2019 | Glenn .................... H04L 63/20 |
| 2019/0295126 A1 * | 9/2019 | Madden ............ G06Q 30/0256 |
| 2020/0090170 A1 | 3/2020 | Jalili |
| 2020/0098053 A1 | 3/2020 | Lesner et al. |
| 2020/0177595 A1 | 6/2020 | Rakshit et al. |
| 2020/0184296 A1 * | 6/2020 | Oliver .................... G07F 7/0846 |
| 2020/0265512 A1 * | 8/2020 | James .................... G06N 20/20 |
| 2020/0327589 A1 * | 10/2020 | Greenberg ........... G06Q 20/341 |

\* cited by examiner

MACHINE LEARNING BASED SYSTEM FOR AUTHORIZATION OF AUTONOMOUS RESOURCE TRANSFERS BETWEEN DISTRIBUTED IOT COMPONENTS

FIELD OF THE INVENTION

The present invention embraces a machine learning based system for authorization of autonomous resource transfers between distributed IoT components.

BACKGROUND

The Internet of Things (IoT) refers to the use of intelligently connected devices and systems to leverage data gathered by embedded sensors and actuators in machines and other physical objects. The integration of IoT in everyday devices provides a huge opportunity for entities to develop a new dimension of resource transfers capable of improving the quality of life for users. With the new generation of IoT devices, this new dimension may include autonomous resource transfers between IoT devices. Therefore, there is a need for a centralized resource transfer engine for facilitating autonomous resource transfers between distributed IoT devices.

SUMMARY

The following presents a simplified summary of one or more embodiments of the present invention, to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a machine learning based system for authorization of autonomous resource transfers between distributed IoT components is presented. The system comprising at least one non-transitory storage device; and at least one processing device coupled to the at least one non-transitory storage device, wherein the at least one processing device is configured to: receive, from a first autonomous IoT device, a transaction authorization request to execute a transaction with a second autonomous IoT device; receive information associated with the first autonomous IoT device, information associated with the second autonomous IoT device, and information associated with the transaction; initiate an execution of one or more machine learning algorithms on the information associated with the first autonomous IoT device, the information associated with the second autonomous IoT device, and the information associated with the transaction; determine that the first autonomous IoT device is authorized to execute the transaction with the second autonomous IoT device based on at least the execution of one or more machine learning algorithms; transmit a transaction authorization to the first autonomous IoT device to execute the transaction; and receive, from the first autonomous IoT device, an indication that the transaction has been executed.

In some embodiments, the information associated with the first autonomous IoT device comprises at least a device security profile, a device profile, historical IoT claims, exposure data, alert data, one or more accounts associated with the first autonomous IoT device, one or more authorization profiles associated with the one or more accounts, settings associated with the one or more accounts, and exposure patterns.

In some embodiments, the information associated with the second autonomous IoT device comprises at least a device security profile, a device profile, historical IoT claims, exposure data, alert data, one or more accounts associated with the second autonomous IoT device, one or more authorization profiles associated with the one or more accounts, settings associated with the one or more accounts, and exposure patterns.

In some embodiments, the at least one processing device is further configured to determine one or more constraints associated with the transaction based on at least the execution of the one or more machine learning algorithms on the information associated with the first autonomous IoT device, the information associated with the second autonomous IoT device, and the information associated with the transaction; and determine that the first autonomous IoT device is authorized to execute the transaction with the second autonomous IoT device within the one or more constraints.

In some embodiments, the at least one processing device is further configured to receive, from the first autonomous IoT device, an indication that at least one of the first autonomous IoT device and/or the second autonomous IoT device does not satisfy the one or more constraints; determine one or more additional information required to execute the transaction without the one or more constraints; transmit a request to the first autonomous IoT device and/or the second autonomous IoT device to provide the one or more additional information required to execute the transaction without the one or more constraints; receive, from the first autonomous IoT device and/or the second autonomous IoT device, the one or more additional information required to execute the transaction without the one or more constraints; determine that the one or more additional information provided by the first autonomous IoT device and/or the second autonomous IoT device is sufficient to remove the one or more constraints; and transmit the transaction authorization to the first autonomous IoT device to execute the transaction without the one or more constraints.

In some embodiments, the at least one processing device is further configured to receive, from the first autonomous IoT device, an indication that one or more resources associated with the transaction were not delivered in response to the execution of the transaction; transmit a request to the first autonomous IoT device and/or the second autonomous IoT device to provide one or more additional information associated with the transaction; receive, from the first autonomous IoT device and/or the second autonomous IoT device, the one or more additional information associated with the transaction; determine one or more actions to be performed by at least the first autonomous IoT device and/or the second autonomous IoT device to deliver the one or more resources to the first autonomous IoT device based on at least receiving the one or more additional information associated with the transaction; transmit the one or more actions to the first autonomous IoT device and/or the second autonomous IoT device; and receive from the first autonomous IoT device and/or the second autonomous IoT device an indication that the one or more actions have been executed and the one or more resources have been delivered.

In some embodiments, the one or more machine learning algorithms comprises at least a supervised learning algorithm and an unsupervised learning algorithm.

In some embodiments, the at least one processing device is further configured to determine a first device profile associated with the first autonomous IoT device; determine a second device profile associated with the second autonomous IoT device; determine a first exposure score for the first autonomous IoT device based on the first device profile; determine a second exposure score for the second autonomous IoT device based on the second device profile; determine whether the first exposure score and the second exposure score are within a predetermined authorization threshold level; and determine that the first autonomous IoT device is authorized to execute the transaction with the second autonomous IoT device based on at least determining that the first exposure score and the second exposure score are within a predetermined threshold level.

In some embodiments, the first device profile comprises at least available funds associated with the first autonomous IoT device, one or more financial accounts associated with the first autonomous IoT device, one or more entities associated with the first autonomous IoT device, activity history associated with the first autonomous IoT device, payment history associated with the first autonomous IoT device, security characteristics associated with the first autonomous IoT device, activity characteristics associated with the first autonomous IoT device, device characteristics associated with the first autonomous IoT device, authentication and user information associated with the first autonomous IoT device, and connectivity information associated with the first autonomous IoT device.

In some embodiments, the second device profile comprises at least available funds associated with the second autonomous IoT device, one or more financial accounts associated with the second autonomous IoT device, one or more entities associated with the second autonomous IoT device, activity history associated with the second autonomous IoT device, payment history associated with the second autonomous IoT device, security characteristics associated with the second autonomous IoT device, activity characteristics associated with the second autonomous IoT device, device characteristics associated with the second autonomous IoT device, authentication and user information associated with the second autonomous IoT device, and connectivity information associated with the second autonomous IoT device.

In some embodiments, determining that the first autonomous IoT device is authorized to execute the transaction with the second autonomous IoT device further comprises initiating a policy and compliance engine for autonomous transactions, wherein the policy and compliance engine is configured to perform a compliance evaluation on the transaction.

In some embodiments, the at least one processing device is further configured to determine that the first autonomous IoT device is authorized to execute the transaction with the second autonomous IoT device based on at least determining that the transaction has passed the compliance evaluation.

In some embodiments, the at least one processing device is further configured to: determine that the first autonomous IoT device is not authorized to execute the transaction with the second autonomous IoT device; transmit instructions to the first autonomous IoT device, wherein the instructions comprise a denial of authorization to execute the transaction; receive, from the first autonomous IoT device, an indication that the transaction has been aborted.

In another aspect, computer implemented method for machine learning based system for authorization of autonomous resource transfers between distributed IoT components is presented. The method comprising: receiving, from a first autonomous IoT device, a transaction authorization request to execute a transaction with a second autonomous IoT device; receiving information associated with the first autonomous IoT device, information associated with the second autonomous IoT device, and information associated with the transaction; initiating an execution of one or more machine learning algorithms on the information associated with the first autonomous IoT device, the information associated with the second autonomous IoT device, and the information associated with the transaction; determining that the first autonomous IoT device is authorized to execute the transaction with the second autonomous IoT device based on at least the execution of one or more machine learning algorithms; transmitting a transaction authorization to the first autonomous IoT device to execute the transaction; and receiving, from the first autonomous IoT device, an indication that the transaction has been executed.

In yet another aspect, a computer program product for a machine learning based system for authorization of autonomous resource transfers between distributed IoT components is presented. The computer program product comprising a non-transitory computer-readable medium comprising code causing a first apparatus to: receive, from a first autonomous IoT device, a transaction authorization request to execute a transaction with a second autonomous IoT device; receive information associated with the first autonomous IoT device, information associated with the second autonomous IoT device, and information associated with the transaction; initiate an execution of one or more machine learning algorithms on the information associated with the first autonomous IoT device, the information associated with the second autonomous IoT device, and the information associated with the transaction; determine that the first autonomous IoT device is authorized to execute the transaction with the second autonomous IoT device based on at least the execution of one or more machine learning algorithms; transmit a transaction authorization to the first autonomous IoT device to execute the transaction; and receive, from the first autonomous IoT device, an indication that the transaction has been executed.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
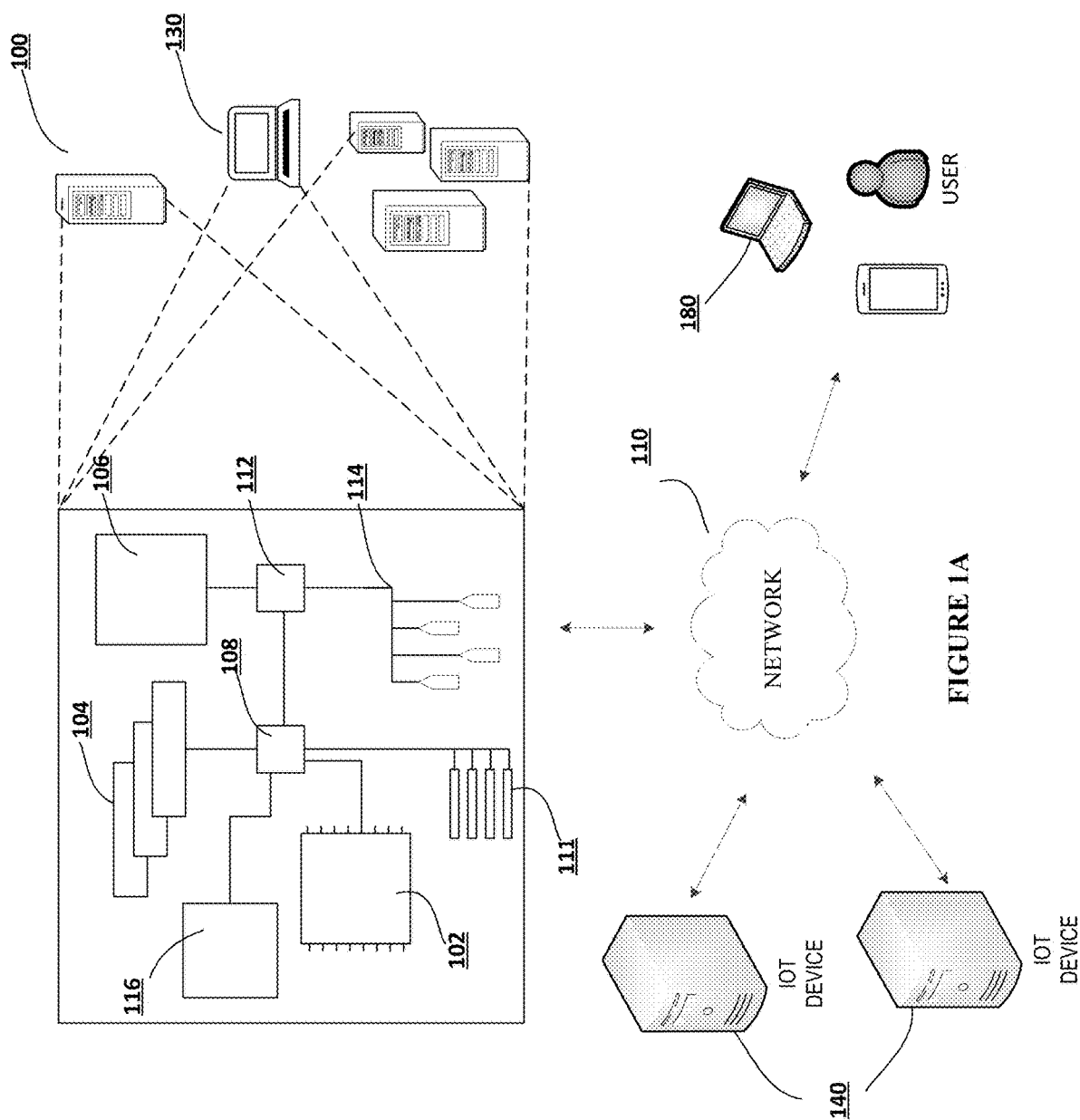
Figure 1B:
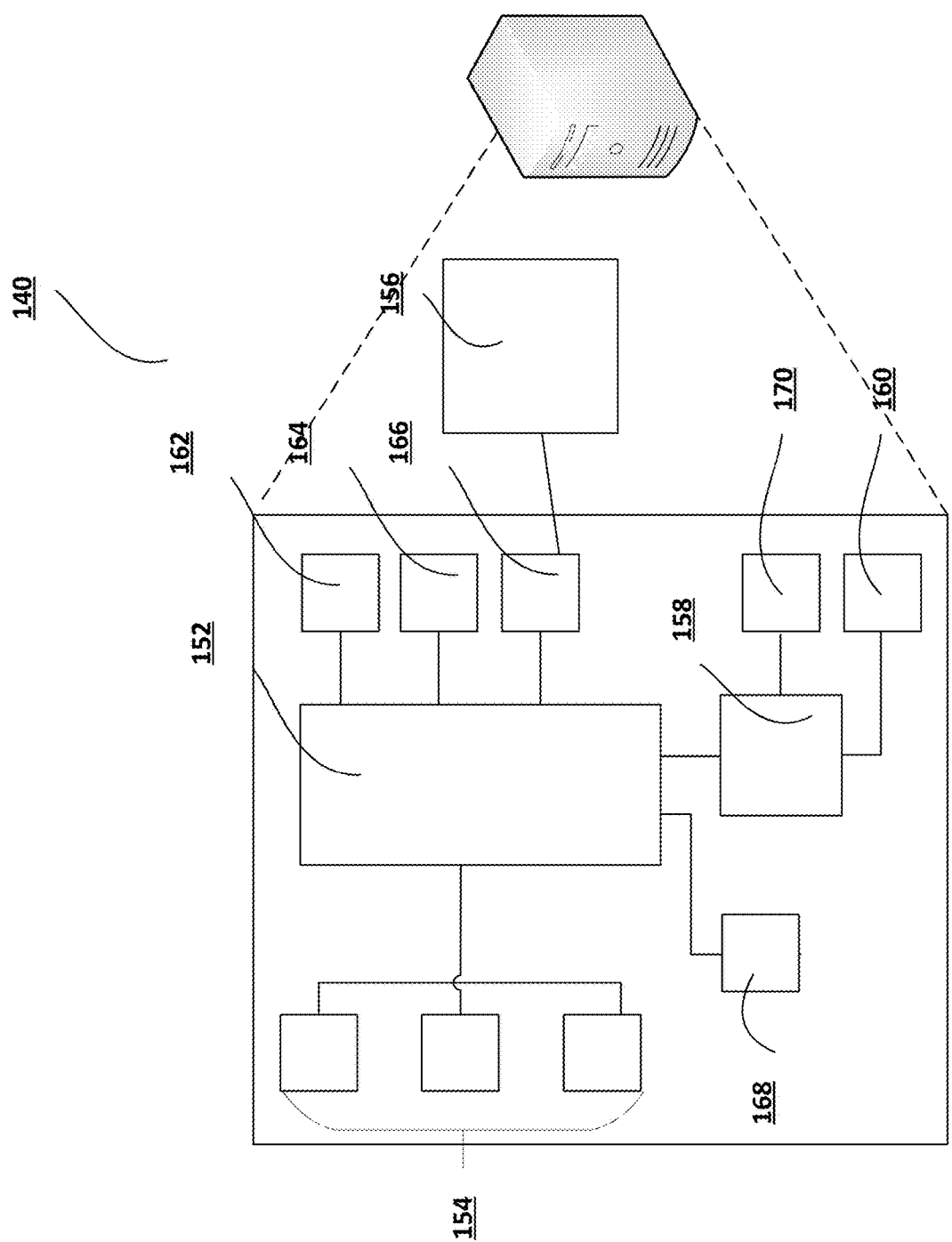
Figure 1C:
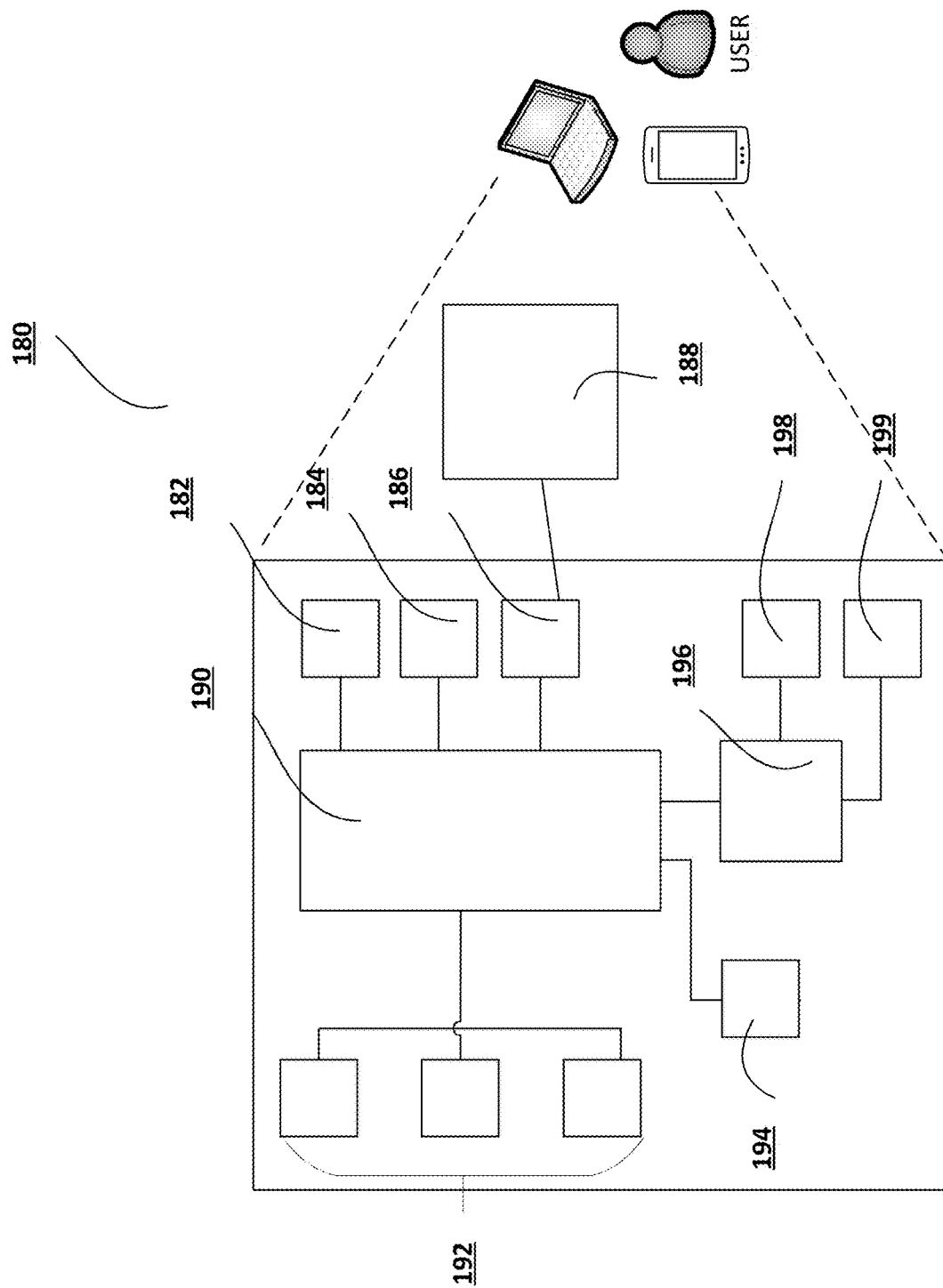
Figure 2:
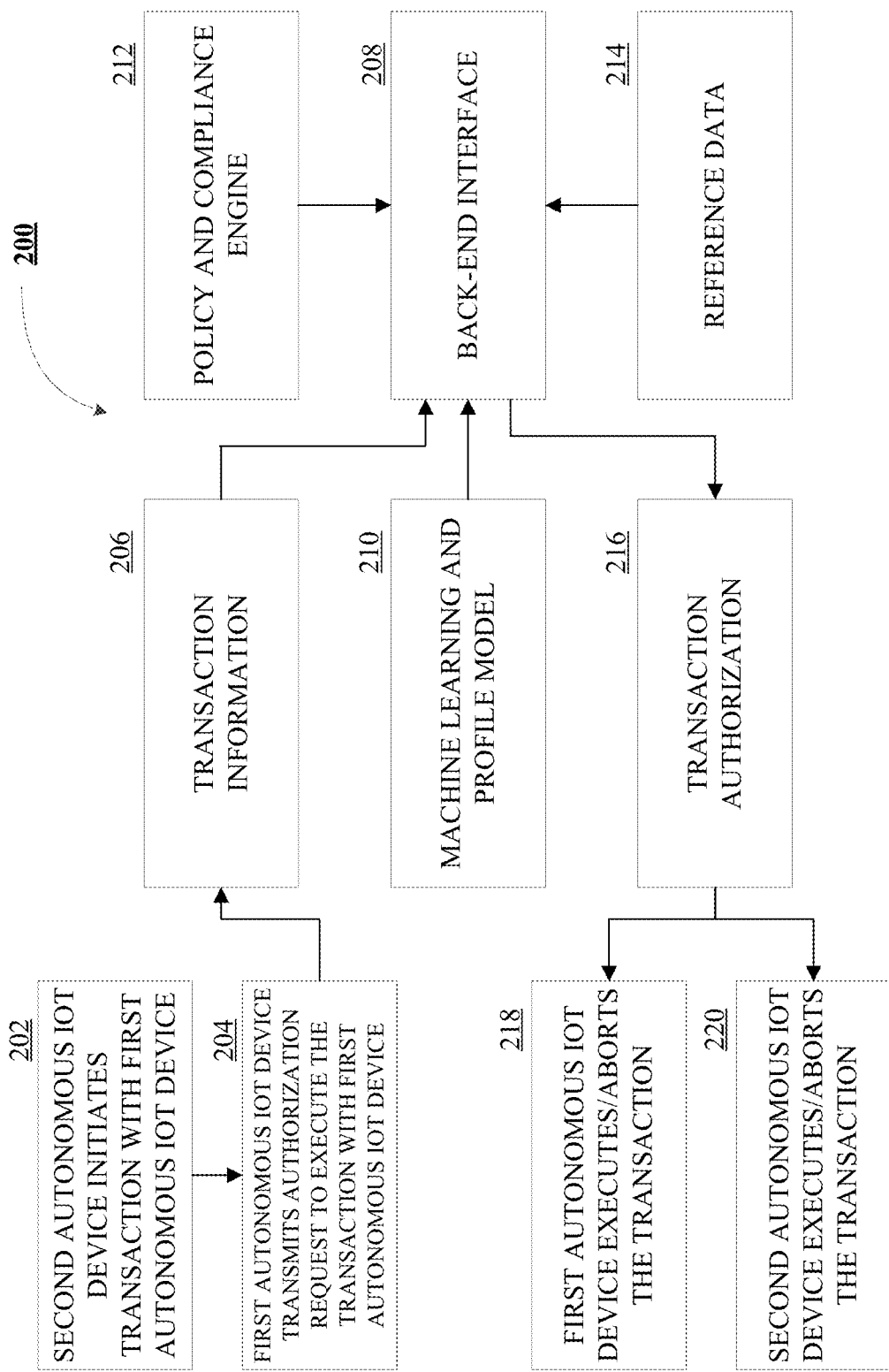
Figure 3:
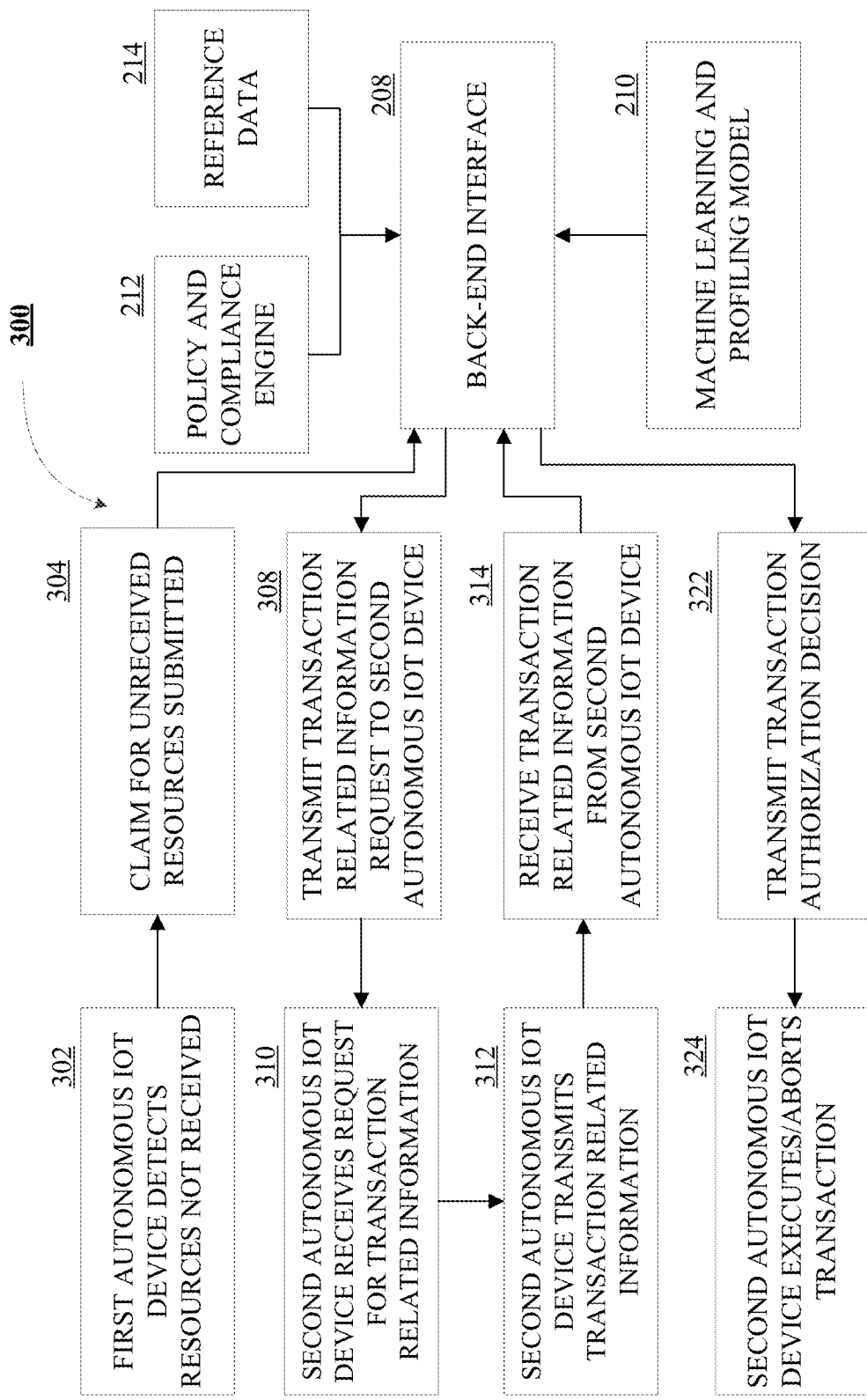
Figure 4:
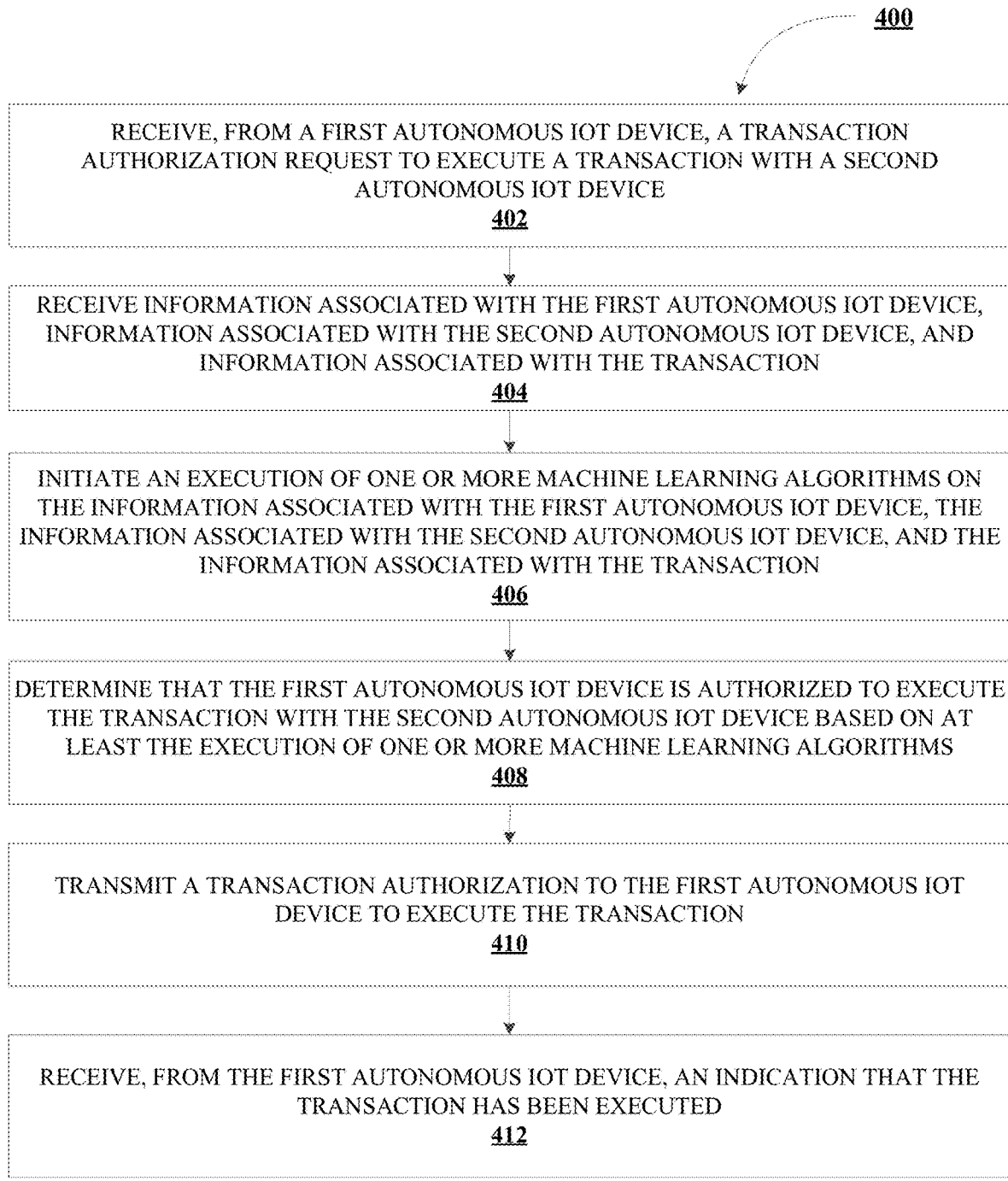
Figure 5:
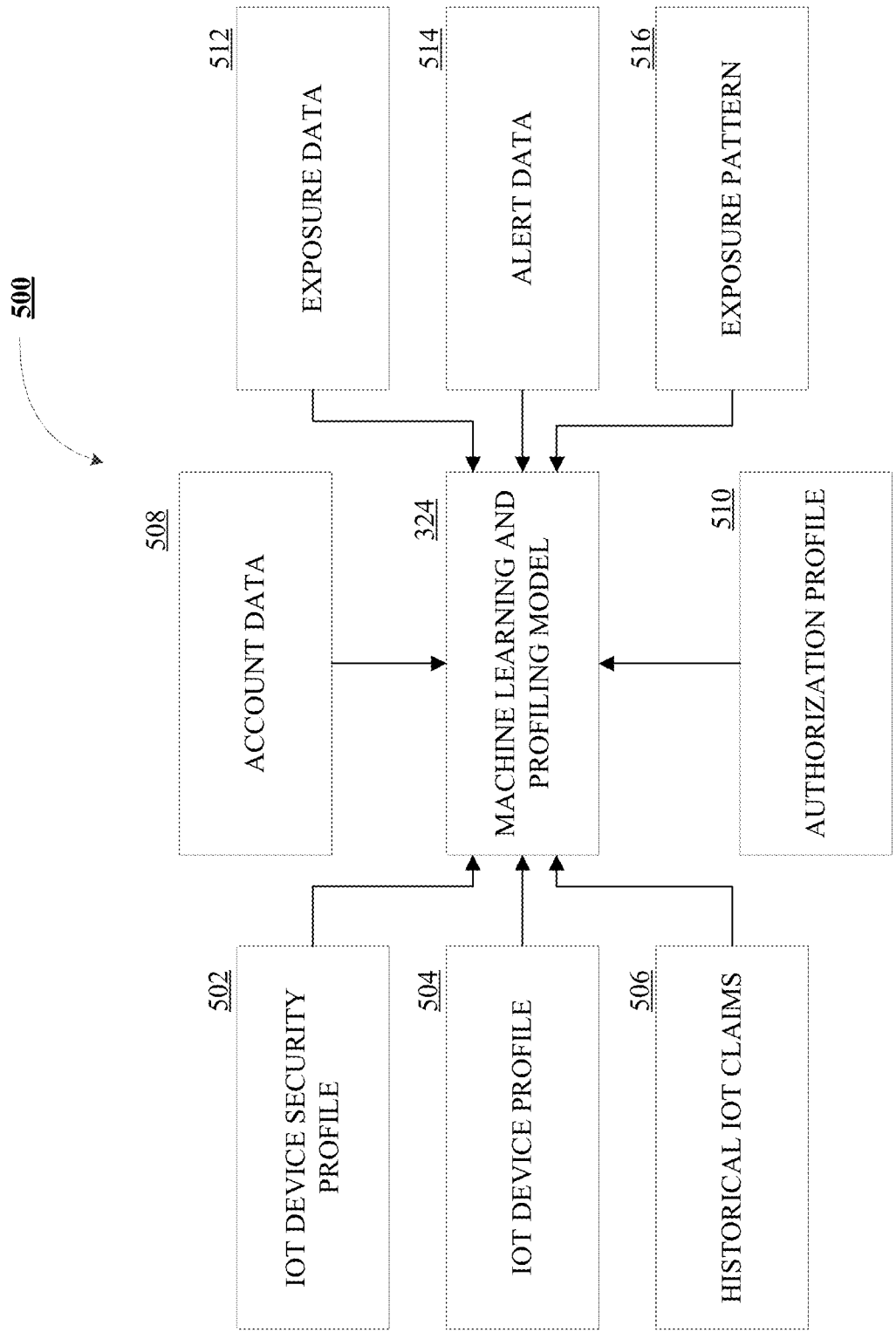
Figure 6:
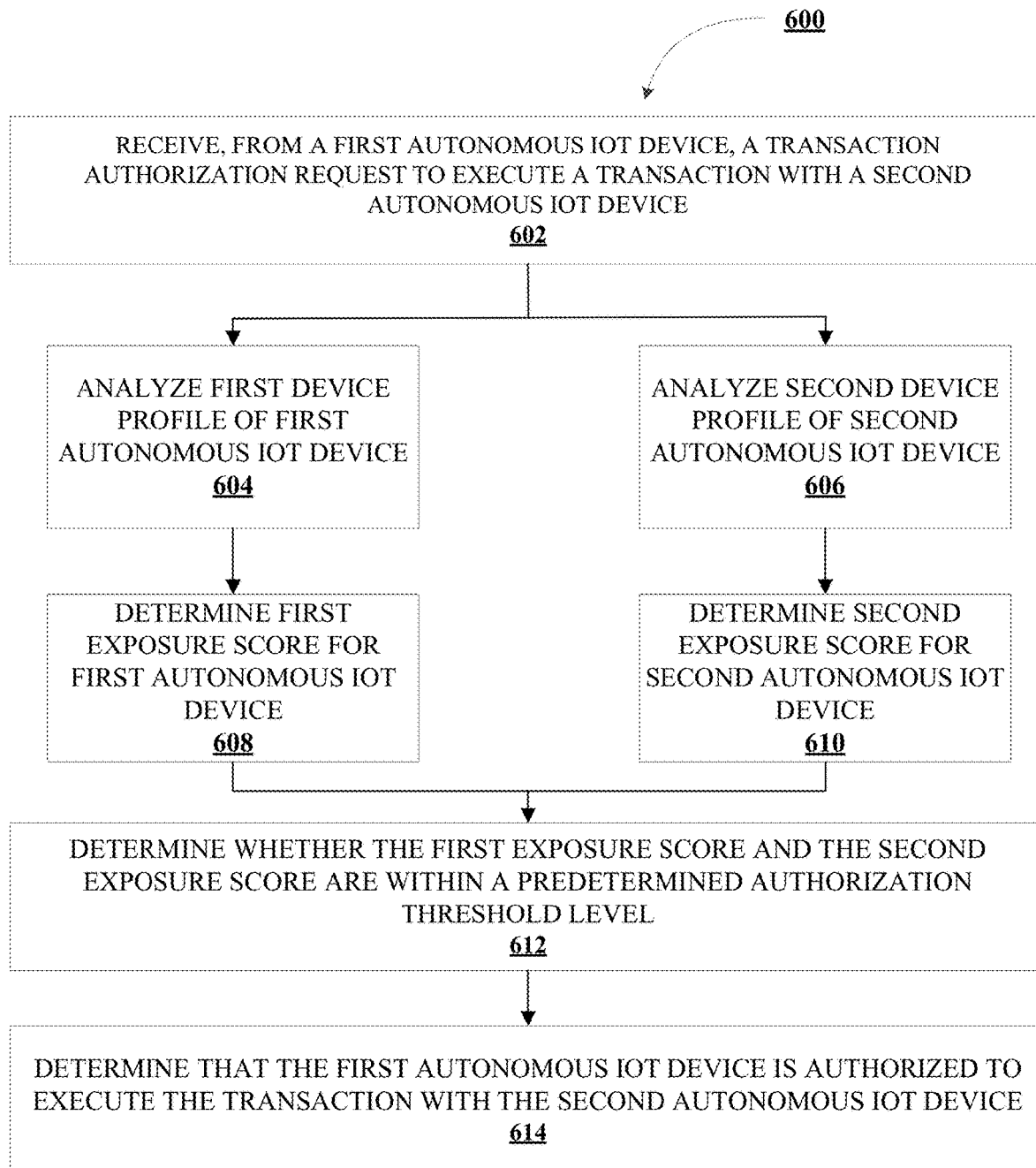

Having thus described embodiments of the invention in general terms, reference will now be made the accompanying drawings, wherein:

FIG. 1A presents an exemplary block diagram of the system environment for a centralized resource transfer engine for facilitating resource transfers between distributed IoT devices, in accordance with an embodiment of an invention;

FIG. 1B illustrates an exemplary IoT device, in accordance with an embodiment of the invention;

FIG. 1C illustrates an exemplary user input system, in accordance with an embodiment of the invention;

FIG. 2 illustrates a process flow for a centralized resource transfer engine for facilitating resource transfers between distributed IoT devices, in accordance with an embodiment of the invention;

FIG. 3 illustrates a process flow for a centralized resource transfer engine for resolving a claim related to the transfer of resources between distributed IoT devices, in accordance with an embodiment of the invention;

FIG. 4 illustrates a process flow for a machine learning based system for authorization of autonomous resource transfers between distributed IoT devices, in accordance with an embodiment of the invention;

FIG. 5 illustrates a machine learning and profiling model for authorization of autonomous resource transfers between distributed IoT devices, in accordance with an embodiment of the invention; and FIG. 6 illustrates an automated threat assessment system for authorizing resource transfers between distributed IoT devices, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, an "IoT device" may refer to any device capable of being communicably and operatively connected to one or more other devices within a mutual network environment. Typically, devices that can communicate with one or more other devices within a network environment independently of user intervention are referred to as an autonomous IoT device. Any physical object can be transformed into an IoT device if the physical object is network-enabled. In this regard, an IoT device can be both an active IoT device within the network environment, or a passive IoT device within the network environment. An active IoT device is an IoT device that is capable of executing resource transfer with one or more other IoT devices within the network environment. Active IoT devices are capable of both transmitting and receiving resources. For example, a smart refrigerator is an active IoT device that is capable of performing self-analysis, communicating with a smart terminal associated with a grocery store, and ordering groceries. In another example, a smart wearable device is an active IoT device capable of recognizing a smart terminal associated with a train station as the user enters the train station and initiates a communication link with the smart terminal to begin a ticket purchase transaction. In contrast, a passive IoT device is only capable of receiving resources from one or more other devices within the network environment. For example, a smart light bulb is a passive IoT device capable of only receiving electrical pulses from one or more other devices within the network environment for its operation. For purposes of this invention, the IoT devices, autonomous or otherwise, are active IoT devices.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. Examples of resources that may not necessarily be associated with accounts may be particularized goods, such as distinct pieces of furniture, equipment, perishable items, or other valuables, or the like. Similarly, "funds" or "available balance" refer to types of resources. For example, the term "fund" may be used to refer to one or more sets of monetary resources available to a user and may also be referred to as an available balance, a collected balance, good funds, and usable funds.

In the context of example implementations described herein, a "transaction" or "resource transfer" refers to any distribution of resources and/or an obligation to return resources to and/or from a user and/or an autonomous IoT device. A transaction may refer to a purchase of goods or services, a return of goods or services, a payment transaction, a credit transaction, or other interaction involving an account. Each of these accounts may tie into a higher-level account proxy and/or an account associated with a user. In one aspect, at least a portion of the transactions executed by the autonomous IoT device involving an account may require authorization by a user. For example, a smart TV may always require user authorization prior to purchasing a movie. In another aspect, at least a portion of the transactions executed by the autonomous IoT device involving an account may be entirely autonomous and without requiring any user intervention. For example, a smart refrigerator may automatically place an order for additional grocery items based on a self-analysis of its contents without requiring user authorization. As described herein, each autonomous IoT device may include one or more accounts with each account having resources capable of being transacted. In example implementations, one or more accounts associated with the autonomous IoT device may be restricted to contain a predetermined amount of resources available for transfer in a transaction. For example, a smart TV may be assigned a $100 limit for automated transactions, requiring user authorization for transactions after the $100 limit has been spent. In another example, a smart TV may be assigned a $50 limit for each autonomous transaction, requiring user authorization for a transaction that exceeds the $50 limit. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In accordance with embodiments of the invention, the terms "financial institution" and "financial entity" include any organization that processes financial transactions including, but not limited to, banks, credit unions, savings and loan associations, investment companies, stock brokerages, asset management firms, insurance companies and the like.

As used herein, a "user interface" or "interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication information" or "authentication credentials" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, accessing of stored data by one or more nodes of a computing cluster, a transmission of a requested task, or the like.

FIG. 1A presents an exemplary block diagram of the system environment for a centralized resource transfer engine for facilitating resource transfers between distributed IoT devices 100, in accordance with an embodiment of an invention. FIG. 1A provides a unique system that includes specialized servers and system communicably linked across a distributive network of nodes required to perform the functions of the process flows described herein in accordance with embodiments of the present invention.

As illustrated, the system environment 100 includes a network 110, a managing entity system 130, one or more autonomous IoT devices 140, and a user input system 180. Also shown in FIG. 1A is a user of the user input system 180. The user input system 180 may be a mobile device or other non-mobile computing device capable of communicating, via the network 110, with the managing entity system 130, the one or more autonomous IoT devices 140, and one or more other devices (not shown). In some embodiments, the user may be a person who uses the user input system 180 to execute one or more applications stored thereon to manage and configure the managing entity system 130, one or more autonomous IoT devices 140, and one or more other devices (not shown).

As shown in FIG. 1A, the managing entity system 130, the user input system 180, and the one or more autonomous IoT devices 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless, wired and/or optical interconnection technology.

In some embodiments, the managing entity system 130, the user input system 180, and/or the one or more autonomous IoT devices 140 may be used to implement the processes described herein, including the mobile-side and server-side processes for installing a computer program from a mobile device to a computer, in accordance with an embodiment of the present invention. The managing entity system 130 is intended to represent various forms of digital computers, such as laptops, desktops, workstations, personal digital assistants, servers, blade servers, mainframes, and other appropriate computers. The user input system 180 is intended to represent various forms of mobile devices, such as personal digital assistants, cellular telephones, smartphones, and other similar computing devices. The autonomous IoT devices 140 are intended to represent smart appliances, smart electronics, wearables, smart meters, commercial security systems, smart city technologies, such as those used to monitor traffic and weather conditions, and other technologies including smart air conditioning, smart thermostats, smart lighting and smart security, span home, enterprise, industrial uses, and/or the like. The components shown here, their connections and relationships, and their functions, are meant to be exemplary only, and are not meant to limit implementations of the inventions described and/or claimed in this document.

In accordance with some embodiments, the managing entity system 130 may be a system owned or otherwise controlled by a managing entity to perform one or more process steps described herein. In general, the managing entity system 130 is configured to communicate information or instructions with the user input system 180, the one or more autonomous IoT devices 140, and one or more other devices, across the network 110. For example, the managing entity system 130 may perform at least some of the processes described herein or may cause one or more other systems described herein to perform the one or more of these process steps. In this regard, the managing entity system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the managing entity system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to managing entity system 130 may be connected, with each system providing portions of the necessary operations (e.g., as a server bank, a group of blade servers, or a multi-processor system). In some embodiments, the managing entity system 130 may be a server managed by the business. The managing entity system 130 may be located at the facility associated with the business or remotely from the facility associated with the business.

The memory 104 stores information within the managing entity system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the managing entity system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 1408 manages bandwidth-intensive operations for the managing entity system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The managing entity system 130 may be implemented in a number of different forms. For example, it may be implemented as a standard server, or multiple times in a group of such servers. Additionally, the managing entity system 130 may also be implemented as part of a rack server system or a personal computer such as a laptop computer. Alternatively, components from managing entity system 130 may be combined with one or more other same or similar systems and the entire managing entity system 130 may be made up of multiple computing devices communicating with each other.

FIG. 1B illustrates an exemplary autonomous IoT device 140, in accordance with an embodiment of the invention. The autonomous IoT device 140 includes a processor 152, memory 154, an input/output device such as a display 156, a communication interface 158, and a transceiver 160, among other components. The IoT autonomous device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the autonomous IoT device 140, including instructions stored in the memory 154. The processor may be implemented as a chipset of chips that include separate and multiple analog and digital processors. The processor 152 may be configured to provide, for example, for coordination of the other components of the autonomous IoT device 140, such as control of user interfaces, applications run by autonomous IoT device 140, and wireless communication by autonomous IoT device 140.

The processor 152 may be configured to communicate with the managing entity system 130, one or more other autonomous IoT devices 140, and one or more other devices (not shown) connected to the network 110 through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from the managing entity systems 130, one or more other autonomous IoT devices 140, and one or more other devices (not shown) connected to the network 110, and convert them for submission to the processor 152. In addition, an external interface 168 may be provided in communication with processor 152, to enable near area communication of the autonomous IoT device 140 with other devices. External interface 168 may provide, for example, for wired communication in some implementations, or for wireless communication in other implementations, and multiple interfaces may also be used.

The memory 154 stores information within the autonomous IoT device 140. The memory 154 can be implemented as one or more of a computer-readable medium or media, a volatile memory unit or units, or a non-volatile memory unit or units. Expansion memory may also be provided and connected to user input system 180 through an expansion interface (not shown), which may include, for example, a SIMM (Single In Line Memory Module) card interface. Such expansion memory may provide extra storage space for the autonomous IoT device 140, or may also store applications or other information therein. In some embodiments, expansion memory may include instructions to carry out or supplement the processes described above, and may include secure information also. For example, expansion memory may be provided as a security module for the autonomous IoT device 140, and may be programmed with instructions that permit secure use of the autonomous IoT device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the managing entity system 130 and/or the user computing system 180 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

The autonomous IoT device 140 may communicate with the managing entity system 130, the user input system 180, one or more other IoT devices (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to the autonomous IoT device 140, which may be used as appropriate by applications running thereon, and in some embodiments, one or more applications operating on the managing entity system 130.

FIG. 1C illustrates an exemplary user input system 180, in accordance with an embodiment of the invention. The user input system 180 includes a processor 190, memory 192, an input/output device such as a display 188, a communication interface 196, and a transceiver 199, among other components. The user input system 180 may also be provided with a storage device, such as a microdrive or other device, to provide additional storage. Each of the components 190, 192, 196, and 199, are interconnected using various buses, and several of the components may be mounted on a common motherboard or in other manners as appropriate.

The processor 190 is configured to execute instructions within the user input system 180, including instructions stored in the memory 192. The processor may be implemented as a chipset of chips that include separate and multiple analog and digital processors. The processor may be configured to provide, for example, for coordination of the other components of the user input system 180, such as control of user interfaces, applications run by user input system 180, and wireless communication by user input system 180.

The processor 190 may be configured to communicate with the user through control interface 184 and display interface 186 coupled to a display 188. The display 188 may be, for example, a TFT LCD (Thin-Film-Transistor Liquid Crystal Display) or an OLED (Organic Light Emitting Diode) display, or other appropriate display technology. The display interface 188 may comprise appropriate circuitry and configured for driving the display 188 to present graphical and other information to a user. The control interface 184 may receive commands from a user and convert them for submission to the processor 190. In addition, an external interface 194 may be provided in communication with processor 190, to enable near area communication of user input system 180 with other devices. External interface 194 may provide, for example, for wired communication in some implementations, or for wireless communication in other implementations, and multiple interfaces may also be used.

The memory 192 stores information within the user input system 180. The memory 192 can be implemented as one or more of a computer-readable medium or media, a volatile memory unit or units, or a non-volatile memory unit or units. Expansion memory may also be provided and connected to user input system 180 through an expansion interface (not shown), which may include, for example, a SIMM (Single In Line Memory Module) card interface. Such expansion memory may provide extra storage space for user input system 180, or may also store applications or other information therein. In some embodiments, expansion memory may include instructions to carry out or supplement the processes described above, and may include secure information also. For example, expansion memory may be provided as a security module for user input system 180 and may be programmed with instructions that permit secure use of user input system 180. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the managing entity system 130 and/or the user computing system 180 may interact with one another and may be configured to implement any one or more portions of the various user interfaces and/or process flow described herein.

The memory 192 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 192, expansion memory, memory on processor 190, or a propagated signal that may be received, for example, over transceiver 199 or external interface 194.

In some embodiments, the user may use the user input system 180 to transmit and/or receive information or commands to and from the managing entity system 130, one or more IoT autonomous devices 140, and one or more other devices connected to the network 110. In this regard, the user input system 180 may be configured to establish a communication link with the managing entity system 130, one or more autonomous IoT devices 140, and one or more other devices connected to the network 110 independently, whereby the communication link establishes a data channel (wired or wireless) to facilitate the transfer of data between the user input system 180 and the managing entity system 130, one or more autonomous IoT devices 140, and one or more other devices connected to the network 110. In doing so, the user input system 180 may be configured to access one or more aspects of the managing entity system 130, one or more IoT autonomous devices 140, and one or more other devices connected to the network 110, such as, a GPS device, an image capturing component (e.g., camera), a microphone, a speaker, or the like.

The user input system 180 may communicate with the managing entity system 130, one or more IoT autonomous devices 140, and one or more other devices connected to the network 110 wirelessly through communication interface 196, which may include digital signal processing circuitry where necessary. Communication interface 196 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 199. In addition, short-range communication may occur, such as using a Bluetooth, Wi-Fi, or other such transceiver (not shown). In addition, GPS (Global Positioning System) receiver module 198 may provide additional navigation—and location-related wireless data to user input system 180, which may be used as appropriate by applications running thereon, and in some embodiments, one or more applications operating on the managing entity system 130.

The user input system 180 may also communicate audibly using audio codec 182, which may receive spoken information from a user and convert it to usable digital information. Audio codec 182 may likewise generate audible sound for a user, such as through a speaker, e.g., in a handset of user input system 180. Such sound may include sound from voice telephone calls, may include recorded sound (e.g., voice messages, music files, etc.) and may also include sound generated by one or more applications operating on the user input system 180, and in some embodiments, one or more applications operating on the managing entity system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1A is exemplary and that other embodiments may vary. As another example, in some embodiments, the managing entity system 130 includes more, less, or different components. As another example, in some embodiments, some or all of the portions of the system environment 100 may be combined into a single portion. Likewise, in some embodiments, some or all of the portions of the managing entity system 130 may be separated into two or more distinct portions.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Internet-of-things (IoT) is a collection of disparate, bespoke networks. In one example, cars today include multiple networks to control the functioning of its engine, safety features, communications systems, etc. In another example, commercial and residential buildings include networking capability for various control systems including, but not limited to, heating, venting, and air conditioning (HVAC), telephone networks, security, and electricity. IoT will enable these disparate networks to be connected with added analytics and management capabilities to become even more powerful in what it can help people achieve. In addition to connecting various devices, IoT expects to connect both inanimate and living things. In one example, wearable devices such as fitness trackers enable collection of biometric data from individuals and integrate the data into the IoT landscape. In another example, livestock were tracked using RFID tags positioned on each animal to track their health and behavior in the herd. In this way, IoT will enable the use of sensors embedded in the physical objects to monitor specific conditions such as location, vibration, motion, and temperature, and operatively connect these sensors to other systems to analyze the information recorded via these sensors.

IoT extends network connectivity beyond traditional devices like desktop and laptop computers, smartphones and tablets to a diverse range of devices and everyday things that utilize embedded technology to communicate and interact with the external environment, all via the network. As each IoT device becomes increasingly intelligent through technology generations, their functional capability has been developed to enable these devices to execute many actions autonomously between each other. Among other actions, IoT devices are currently capable of executing resource transfers (e.g. financial transactions) with other IoT devices (and non-IoT devices) autonomously. For example, the smart refrigerator can make purchases from local grocery store based on its self-analysis of contents; a smart vehicle can pay for parking or other services such as tolls, autonomously; smart watches can pay for train tickets. Thus, devices are at the core of IoT and are responsible for collecting data and interacting with other devices and living things. However, these devices are most vulnerable to exposure, making the autonomous resource transfers a concern. With an increase in the number of IoT devices participating in autonomous resource transfers, the complexity and size of the resource transfer engine increases. There is a need for a centralized resource transfer engine maintained by the managing entity system 130 for facilitating resource transfers between distributed IoT devices. This invention provides the functional benefit of establishing a resource transfer network environment to enable a peer-to-peer distributed non-centralized IoT economy and improve the security and reliability of IoT based resource transfers.

FIG. 2 illustrates a process flow for a centralized resource transfer engine for facilitating resource transfers between distributed IoT devices 200, in accordance with an embodiment of the invention. As shown in block 202, the second autonomous IoT device initiates a transaction with a first autonomous IoT device. In some embodiments, the second autonomous IoT device may be required to have access permissions to the first autonomous IoT device to be able to initiate a transaction with the first autonomous IoT device. In this regard, the second autonomous IoT device may be assigned permissions or access rights to specific features associated with the first autonomous IoT device. These permissions specify the type of transactions each autonomous IoT device is capable of initiating and how each autonomous IoT device should handle access attempts from other autonomous IoT devices for execution of transactions. In some embodiments, when an autonomous IoT device is set up, the initial access permissions for the device are preset according to a predefined scheme. These preset permissions may be modified to expand the access permission and/or restrict the access permission for the autonomous IoT device.

For example, a user with administrative access to the smart refrigerator may preconfigure the access permission of the smart refrigerator to communicate with a smart terminal of a specific grocery store to initiate a transaction autonomously. In another example, user of the smart wearable device may preconfigure the access permission of the smart wearable device to communicate with one or more smart terminals associated with one or more train stations when the smart wearable device is in communicable range with the one or more smart terminals autonomously. In yet another example, a smart city's IoT terminal may be pre-configured to exchange statistical information such as traffic congestion data, energy usage information, or the like, with one or more neighboring smart cities' IoT terminal.

In some embodiments, configuring the access permission for an autonomous IoT device may include establishing a secure pairing between the autonomous IoT device and one or more other autonomous IoT devices to protect their subsequent communication. In one aspect, the secure pairing may be configured manually. In this regard, a user with access to the autonomous IoT device may configure the autonomous IoT device manually to establish a security association with one or more other autonomous IoT devices. In another aspect, the autonomous IoT device may be configured to establish a security association with one or more other autonomous IoT devices in an ad hoc manner. In this regard, the autonomous IoT device may recognize the presence of one or more other autonomous IoT devices using radio-transceivers embedded within each autonomous IoT device. In response to recognizing the one or more other autonomous IoT devices, the autonomous IoT device may initiate the security association with the one or more other autonomous IoT devices. As will be appreciated by one of ordinary skill in the art in view of this disclosure, the present invention may use a number of different secure device pairing protocols to execute the security association.

In some embodiments, when the second autonomous IoT device initiates the transaction with the first autonomous IoT device, the transaction is typically for an exchange of resources between the first autonomous IoT device and the second autonomous IoT device. In some embodiments, the second IoT device is stationary and the first IoT device is mobile, or vice versa. For example, mobile smart devices such as smart watches, smart phones, laptops, fitness trackers, health monitoring devices, wearable payment devices may be configured to initiate a transaction with stationary smart node such as a smart terminal capable of being paired with the mobile smart devices. In some other embodiments, both the second IoT autonomous device and the first IoT autonomous device are mobile. For example, smart vehicles can communicate detour, traffic accident, and congestion information with nearby vehicles early, in real-time, to reduce traffic jam near the affected areas. In yet another embodiment, both the first autonomous IoT device and second autonomous IoT device are stationary. For example, a smart refrigerator can communicate with a smart terminal of a grocery store to automatically order additional items based on a self-analysis of its contents.

Next, as shown in block 204, the first autonomous IoT device transmits an authorization request to execute the transaction with the first autonomous IoT device. In some embodiments, the second autonomous IoT's initiation of the transaction triggers the first autonomous IoT device to transmit an authorization request to the back-end interface 208 associated with the centralized resource transfer engine. Next, as shown in block 206, in addition to receiving the transaction authorization request, the back-end interface 208 receives transaction information 206. In some embodiments, the back-end interface 208 receives information associated with the first autonomous IoT device and information associated with the second autonomous IoT device, in addition to the information associated with the transaction.

In some embodiments, the information associated with the autonomous IoT devices include, but are not limited to a device security profile, a device profile, historical IoT claims, exposure data, alert data, one or more accounts associated with the IoT device, one or more authorization profiles associated with the one or more accounts, settings associated with the one or more accounts, and exposure patterns. In some embodiments, each autonomous IoT device initiating or requesting authorization to execute a transaction may be authorized to transmit only a portion of their information in response to an information request by the centralized resource transfer engine. This may be due to any number of reasons. In one aspect, each autonomous IoT device may be pre-authorized to share only a subset of the information autonomously when requested by the centralized resource transfer engine. In another aspect, each autonomous IoT device may be privy to only a subset of information. In response to the information request from the centralized resource transfer engine, the autonomous IoT device can transmit only the subset of information that is available. In yet another aspect, transmission of at least a portion of the information associated with the autonomous IoT device in response to a request from the centralized resource transfer engine requires additional user authentication.

In response to receiving the information associated with the first autonomous IoT device, the second autonomous IoT device, and the transaction information, the process flow includes employing a policy and compliance engine 212, a machine learning and profile model 210, and reference data 214, to determine whether the first autonomous IoT device is authorized to execute the transaction with the second autonomous IoT device. In some embodiments, the policy and compliance engine 212 is a centralized process for creating and managing policies, standards, and internal control procedures that are cross-mapped to external regulations and best practices. By employing the policy and compliance engine 212, the centralized resource transfer engine determines whether the transaction meets the requirements of the policies, standards and any internal/external control procedures. In some embodiments, the machine learning and profiling model 210 includes one or more analytical artifacts generated using information associated with the one or more autonomous IoT devices and the transaction to determine a likelihood of exposure associated with the execution of the transaction. In some embodiments, the reference data 214 includes any are the data objects relevant to transactions, consisting of sets of values, statuses or classification schema such as account information, financial information, historical transaction data, and/or the like.

In some embodiments, based on the amount of information received in response to the request for information, the centralized resource transfer engine may be configured to determine one or more constraints associated with the transaction. In some embodiments, the one or more constraints may be substantial constraints or procedural constraints. In one aspect, substantial constraints may refer to the one or more limits on the type of resources being transferred, a method of transfer of the resources, quality of resources being transferred, amount of resources being transferred during each transaction, and/or the like. In another aspect, procedural constraints may refer to a degree of connectivity requirement between the autonomous IoT devices, connection availability, type of connectivity, and/or the like. In some embodiments, the one or more constraints and the information received from the first autonomous IoT device and the second autonomous IoT device may be inversely correlated, i.e., the more the information received from the first autonomous IoT device and the second autonomous IoT device, the fewer the one or more constraints.

Next, as shown in block 216, the centralized resource transfer engine may be configured to communicate to the first autonomous IoT device and/or the second autonomous IoT device, via the back-end interface 208, that the transaction is authorized to be executed within the one or more constraints. In some other embodiments, the centralized resource transfer engine may be configured to communicate to the first autonomous IoT device and/or the second autonomous IoT device, via the back-end interface 208, that the transaction is not authorized to be executed. In response, as shown in block 218, the first autonomous IoT device either executes the transaction if the transaction authorization is granted, or aborts the transaction if the transaction authorization is denied. Similarly, as shown in block 220, the second autonomous IoT device either executes the transaction if the transaction authorization is granted, or aborts the transaction if the transaction authorization is denied.

In some embodiments, the centralized resource transfer engine may be configured to receive, from the first autonomous IoT device and/or the second autonomous IoT device, an indication that at least the first autonomous IoT device and/or the second autonomous IoT device does not satisfy the one or more constraints. In this regard, the first autonomous IoT device and/or the second autonomous IoT device may be configured to perform a self-diagnosis to determine whether they satisfy the substantial and the procedural constraints. In response to receiving the indication that the first autonomous IoT device and/or the second autonomous IoT device does not satisfy the one or more constraints, the centralized resource transfer engine may determine one or more additional information required to execute the transaction. In response, the centralized resource transfer engine may be configured to transmit a request to the first autonomous IoT device and/or the second autonomous IoT device to provide the one or more additional information required to execute the transaction. In some embodiments, the additional information may include information that were previously not provided by the first autonomous IoT device and the second autonomous IoT device.

Next, the centralized resource transfer engine may be configured to receive, from the first autonomous IoT device and/or the second autonomous IoT device, the one or more additional information required to execute the transaction. In response, the centralized resource transfer engine may determine that the one or more additional information provided by the first autonomous IoT device and/or the second autonomous IoT device is sufficient to remove the one or more constraints. In some embodiments, the centralized resource transfer engine, in response to receiving the one or more additional information may remove at least a portion of the one or more constraints proportional to the amount of additional information. In response to removing at least a portion of the one or more constraints, the centralized resource transfer engine may be configured to transmit, via the back-end interface 208, the transaction authorization to the first autonomous IoT device and/or the second autonomous IoT device to execute the transaction with a reduced number of constraints.

FIG. 3 illustrates a process flow for a centralized resource transfer engine for resolving a claim related to the transfer of resources between distributed IoT devices 300, in accordance with an embodiment of the invention. As shown in block 302, the first autonomous IoT device detects that one or more resources were not received in response to the execution of the transaction. In response, the first autonomous IoT device transmits a claim for unreceived resources, as shown in block 304, to the centralized resource transfer engine, via the back-end interface 208. In response to receiving the claim for unreceived resources, the centralized resource transfer engine transmits a request for transaction related information to the second autonomous IoT device, as shown in block 308. The second autonomous IoT device receives the request for transaction related information at block 310, and initiates a transmission of the transaction related information to the centralized resource transfer engine at block 312. The back-end interface 208 of the centralized resource transfer engine receives the transaction related information from the second autonomous IoT device, as shown in block 314.

In response to receiving the transaction related information, the centralized resource transfer engine determines whether the second autonomous IoT device can execute the transaction. In this regard, the centralized resource transfer engine initiates the policy and compliance engine 212, the reference data 214, and machine learning and profiling model 210 on the transaction related information received from the second autonomous IoT device. In response to determining whether the second autonomous IoT device can execute the transaction, the back-end interface 208 of the centralized resource transfer engine transmits the transaction authorization decision, as shown in block 322, to the second autonomous IoT device. In response to receiving the transaction authorization decision, the second autonomous IoT device either executes or aborts the transaction, as shown in block 324. If the centralized resource transfer engine determines that the second autonomous IoT device is authorized to execute the transaction, the second autonomous IoT device re-initiates the resource transfer to the first autonomous IoT device. On the other hand, if the centralized resource transfer engine determines that the second autonomous IoT device is not authorized to execute the transaction, the second autonomous IoT device aborts the transaction.

FIG. 4 illustrates a process flow for a machine learning based system for authorization of autonomous resource transfers between distributed IoT devices 400, in accordance with an embodiment of the invention. As used herein, "machine learning algorithms" or "machine learning models" include but are not limited to linear regression, clustering analysis, anomaly detection, logistic regression, neural networks, support vector machines, decision trees, and their derivatives. In practice, one technique can be used in the research effort to provide insights for another machine learning/modeling technique. Thus, a combination of techniques can be used in the analysis and implementation. Machine learning algorithms can be both supervised and unsupervised. Supervised learning algorithms build a mathematical model of a set of data that contains both the inputs and the desired outputs. The data is known as training data, and consists of a set of training examples. Each training example has one or more inputs and a desired output, also known as a supervisory signal. In some embodiments, the one or more inputs may include one or more dimensions.

Here, the one or more dimensions of the one or more inputs include, but are not limited to, information associated with the first autonomous IoT device, the information associated with the second autonomous IoT device, and information associated with the transaction. Unsupervised learning algorithms is used to model the underlying structure or distribution in the data to learning more about the data. Unlike supervised learning, the algorithm does not have a guiding training model for classification, but discovers the underlying structure in the data using clustering or association analysis. As will be appreciated by one of ordinary skill in the art in view of this disclosure, the present invention may use a combination of supervised and unsupervised machine learning algorithms to execute the process flows described herein.

As shown in block 402, the process flow includes receiving, from a first autonomous IoT device, a transaction authorization request to execute a transaction with a second autonomous IoT device. Next, the process flow includes receiving information associated with the first autonomous IoT device, information associated with the second autonomous IoT device, and information associated with the transaction, as shown in block 404. As described herein, the information associated with the autonomous IoT devices includes, but is not limited to, a device security profile, a device profile, historical IoT claims, exposure data, alert data, one or more accounts associated with the IoT device, one or more authorization profiles associated with the one or more accounts, settings associated with the one or more accounts, and exposure patterns.

Next, as shown in block 406, the process flow includes initiating an execution of one or more machine learning algorithms on the information associated with the first autonomous IoT device, information associated with the second autonomous IoT device, and the information associated with the transaction. In some embodiments, prior to executing the one or more machine learning algorithms, the system may be configured to initiate a data pre-processing routine on the information associated with the first autonomous IoT device, information associated with the second autonomous IoT device, and the information associated with the transaction prior to the execution of the machine learning algorithms.

As described herein, the machine learning algorithms may be supervised learning algorithms and/or unsupervised learning algorithms. Using supervised learning principles, for each autonomous IoT device, the machine learning algorithm parses the input variables to learn a target function that best maps the input variables (e.g., historical transaction information) to an output variable (e.g., class labels). There may be many ways to map input variables to output variables for a specific problem. As will be appreciated by one of ordinary skill in the art in view of this disclosure, the present invention may navigate these ways by combining and testing different algorithms, different algorithm configurations, different training data, and so on. Once the target function maps the input variables to the output variables within a predetermined error tolerance, the target function can then be used to predict a class label for future input variables (e.g., future transactions). Using unsupervised learning principles, for each autonomous IoT device, the machine learning algorithm, analyzes the information associated with the autonomous IoT device to recognize a pattern, a cluster, or an anomaly within the input variables. By implementing a combination of supervised and unsupervised learning algorithms, the machine learning algorithms may be configured to determine whether the transaction initiated by the autonomous IoT device is a valid transaction or otherwise.

Next, as shown in block 408, the process flow includes determining that the first autonomous IoT device is authorized to execute the transaction with the second autonomous IoT device based on at least the execution of the one or more machine learning algorithms. In response to determining that the first autonomous IoT device is authorized to execute the transaction with the second autonomous IoT device, the process flow includes transmitting a transaction authorization to the first autonomous IoT device to execute the transaction, as shown in block 410. In some embodiments, in response to transmitting the transaction authorization, the system may be configured to receive, from the first autonomous IoT device, an indication that the transaction has been executed.

FIG. 5 illustrates a machine learning and profiling model for authorization of autonomous resource transfers between distributed IoT devices 210, in accordance with an embodiment of the invention. As described herein, the machine learning and profiling model 210 uses at least the information associated with one or more autonomous IoT devices to determine transaction authorization. As illustrated in FIG. 5, the information includes at least an IoT device security profile 502, an IoT device profile 504, historical IoT claims 506, account data 508, authorization profile 510, exposure data 512, alert data 514, and exposure patterns 516. In some embodiments, a device security profile 502 may include endpoint security, encryption protocols for network connectivity, security features for cloud access, secure web gateway access, and/or the like. In some embodiments, a device profile 504 may include at least a set of attributes (services and/or features) associated with a particular device. More specifically, a device profile 504 may include a name, description, feature settings, serial number, hardware configuration, software versions, and/or the like. In some embodiments, historical IoT claims 506 may include one or more claims submitted by the autonomous IoT device related to past transfer of resources.

In some embodiments, account data 508 includes data associated with one or more accounts associated with the autonomous IoT device. The one or more accounts may be associated with the autonomous IoT device itself or be an account proxy to one or more accounts associated with a user. In some other embodiments, the one or more accounts associated with the autonomous IoT device may be directly associated with the one or more accounts associated with a user. Each of these accounts may be associated with an authorization profile 510. An authorization profile may refer to profiles created for specific users by associating rules (e.g., network authorization policies) such that whenever these rules match the configured attributes, the corresponding authorization profile enables the user to gain access to a resource. For example, with respect to resource management within a dispersed network, the authorization profile includes one or more authorization rules. These authorization rules typically include one or more elements such as name, attribute, and permission. When these rules match the preconfigured attributes of the network environment, the user with the corresponding authorization profile is granted access (e.g., read, write, and/or execute privileges) to the dispersed network (e.g., financial institution network services). In one example, the one or more accounts may be permitted to execute entirely autonomous transactions. In another example, the one or more accounts may be permitted to execute only at least a portion of transactions that require user authentication. In yet another example, the one or more account may be permitted to execute transactions involving one or more specific resource types. In yet another example, the one or more accounts may have a resource transfer limit.

In some embodiments, exposure data 512 may include information associated with one or more exposure related activity reported by the autonomous IoT device, one or more other autonomous IoT devices that have previously transacted with the autonomous IoT device, one or more user devices that have access to the autonomous IoT device, and/or one or more network diagnostic tools capable of performing exposure assessment on the autonomous IoT device. In some embodiments, alert data 514 may refer to any instructions, warnings, errors, or the like reported by the autonomous IoT device, one or more other autonomous IoT devices that have previously transacted with the autonomous IoT device, and/or one or more user devices that have access to the autonomous IoT device. In some embodiments, exposure pattern 516 may refer to any indication of potential exposure associated with the autonomous IoT device based on at least analyzing a device profile and a determining a corresponding exposure score for the autonomous IoT device.

FIG. 6 illustrates an automated threat assessment system for authorizing resource transfers between distributed IoT devices 600, in accordance with an embodiment of the invention. As shown in block 602, the process flow includes receiving, from a first autonomous IoT device, a transaction authorization request to execute a transaction with a second autonomous IoT device. In response to receiving the transaction authorization request, the centralized resource transfer engine may receive information associated with the first autonomous IoT device, information associated with the second autonomous IoT device, and information associated with the transaction. Next, as shown in block 604, the process flow includes analyzing the first device profile associated with the first autonomous IoT device. In addition to receiving the first device profile, the process flow includes analyzing the second device profile associated with the second autonomous IoT device, as shown in block 606.

In some embodiments, the device profile may include, but is not limited to, at least available resources associated with the autonomous IoT device, one or more accounts associated with the autonomous IoT device, one or more entities such as an individual user or an organization associated with the autonomous IoT device, activity history such as audit logs and device logs associated with the autonomous IoT device, resource transfer history associated with the autonomous IoT device indicating number of transaction instances received and number of transactions initiated, security characteristics associated with the autonomous IoT device, i.e., security and encryption protocols implemented to handle sensitive data, security patch status, software versions and upgrades, and/or digital tokens, activity characteristics associated with the autonomous IoT device such as transaction event velocities, device characteristics such as battery levels, screen device characteristics, and/or network capabilities associated with the first autonomous IoT device, authentication and user information associated with the autonomous IoT device, historical exposure data, and/or connectivity information associated with the autonomous IoT device indicating degree of separation from known unauthorized devices, unauthorized accounts, and/or unauthorized users.

Next, as shown in block 608, the process flow includes determining a first exposure score for the first autonomous IoT device. In addition, the process flow includes determining a second exposure score for the second autonomous IoT device, as shown in block 610. In some embodiments, the exposure score is a calculated score that reflects a severity of exposure based on the device profile. In one aspect, the exposure score may be calculated based on at least assigning a weight to each factor associated with the device profile, and determining an aggregate of the probability of impact of each factor on exposure. In some embodiments, determining the exposure score includes both a qualitative exposure assessment and a quantitative exposure assessment. In one aspect, in qualitative exposure assessment, the exposure scores may be calculated using the factors based on ranges in their probability of impact. In another aspect, in quantitative exposure assessment, the exposure scores may be calculated as discrete values or statistical distributions. In some other embodiments, the exposure score may be calculated using both a qualitative exposure assessment and a quantitative exposure assessment.

Next, as shown in block 612, the process flow includes determining whether the first exposure score and the second exposure score are within a predetermined authorization threshold level. In one aspect, the predetermined authorization threshold level may be assigned by the centralized resource transfer engine configured to facilitate the transfer of resources associated with the transaction. In this regard, the centralized resource transfer engine may establish predetermined authorization threshold level based on at least a transaction type associated with the transaction initiated by the first autonomous IoT device and/or the second autonomous IoT device.

Next, as shown in block 614, the process flow incudes determining that the first autonomous IoT device is authorized to execute the transaction with the second autonomous IoT device. In this regard, the centralized resource transfer engine may be configured to determine that the first exposure score and the second exposure score are within the predetermined authorization threshold level. In some embodiments, the first exposure score and the second exposure score may be used as one of the input variables in the one or more machine learning algorithms to determine whether the first autonomous IoT device is authorized to execute the transaction with the second autonomous IoT device.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 9063US1.014033.3464 | To be assigned | CENTRALIZED RESOURCE TRANSFER ENGINE FOR FACILITATING RESOURCE TRANSFERS BETWEEN | Filed Concurrently Herewith |

-continued

| Docket Number | U.S. patent application Ser. No. | Title | Filed On |
|---|---|---|---|
| 9156US1.014033.3482 | To be assigned | DISTRIBUTED INTERNET-OF-THINGS (IOT) COMPONENTS AUTOMATED THREAT ASSESSMENT SYSTEM FOR AUTHORIZING RESOURCE TRANSFERS BETWEEN DISTRIBUTED IOT COMPONENTS | Filed Concurrently Herewith |

What is claimed is:

1. A machine learning based system for authorization of autonomous resource transfers between distributed IoT components, the system comprising:
at least one non-transitory storage device; and
at least one processing device coupled to the at least one non-transitory storage device, wherein the at least one processing device is configured to:
receive, from a first autonomous IoT device, a transaction authorization request to execute a transaction with a second autonomous IoT device;
initiate a policy and compliance engine for autonomous transactions to perform a compliance evaluation on the transaction in response to receiving the transaction authorization request;
determine that the transaction has passed the compliance evaluation;
receive information associated with the first autonomous IoT device, information associated with the second autonomous IoT device, and information associated with the transaction;
initiate an execution of one or more machine learning algorithms on the information associated with the first autonomous IoT device, the information associated with the second autonomous IoT device, and the information associated with the transaction;
determine that the first autonomous IoT device is authorized to execute the transaction with the second autonomous IoT device based on at least the execution of one or more machine learning algorithms and determining that the transaction has passed the compliance evaluation;
transmit a transaction authorization to the first autonomous IoT device to execute the transaction; and
receive, from the first autonomous IoT device, an indication that the transaction has been executed.

2. The system of claim 1, wherein the information associated with the first autonomous IoT device comprises at least a device security profile, a device profile, historical IoT claims, exposure data, alert data, one or more accounts associated with the first autonomous IoT device, one or more authorization profiles associated with the one or more accounts, settings associated with the one or more accounts, and exposure patterns.

3. The system of claim 1, wherein the information associated with the second autonomous IoT device comprises at least a device security profile, a device profile, historical IoT claims, exposure data, alert data, one or more accounts associated with the second autonomous IoT device, one or more authorization profiles associated with the one or more accounts, settings associated with the one or more accounts, and exposure patterns.

4. The system of claim 1, wherein the at least one processing device is further configured to:
determine one or more constraints associated with the transaction based on at least the execution of the one or more machine learning algorithms on the information associated with the first autonomous IoT device, the information associated with the second autonomous IoT device, and the information associated with the transaction; and
determine that the first autonomous IoT device is authorized to execute the transaction with the second autonomous IoT device within the one or more constraints.

5. The system of claim 4, wherein the at least one processing device is further configured to:
receive, from the first autonomous IoT device, an indication that at least one of the first autonomous IoT device and/or the second autonomous IoT device does not satisfy the one or more constraints;
determine one or more additional information required to execute the transaction without the one or more constraints;
transmit a request to the first autonomous IoT device and/or the second autonomous IoT device to provide the one or more additional information required to execute the transaction without the one or more constraints;
receive, from the first autonomous IoT device and/or the second autonomous IoT device, the one or more additional information required to execute the transaction without the one or more constraints;
determine that the one or more additional information provided by the first autonomous IoT device and/or the second autonomous IoT device is sufficient to remove the one or more constraints; and
transmit the transaction authorization to the first autonomous IoT device to execute the transaction without the one or more constraints.

6. The system of claim 1, wherein the at least one processing device is further configured to:
receive, from the first autonomous IoT device, an indication that one or more resources associated with the transaction were not delivered in response to the execution of the transaction;
transmit a request to the first autonomous IoT device and/or the second autonomous IoT device to provide one or more additional information associated with the transaction;
receive, from the first autonomous IoT device and/or the second autonomous IoT device, the one or more additional information associated with the transaction;
determine one or more actions to be performed by at least the first autonomous IoT device and/or the second autonomous IoT device to deliver the one or more resources to the first autonomous IoT device based on at least receiving the one or more additional information associated with the transaction;

transmit the one or more actions to the first autonomous IoT device and/or the second autonomous IoT device; and receive from the first autonomous IoT device and/or the second autonomous IoT device an indication that the one or more actions have been executed and the one or more resources have been delivered.

7. The system of claim 1, wherein the one or more machine learning algorithms comprises at least a supervised learning algorithm and an unsupervised learning algorithm.

8. The system of claim 1, wherein the at least one processing device is further configured to:
determine a first device profile associated with the first autonomous IoT device;
determine a second device profile associated with the second autonomous IoT device;
determine a first exposure score for the first autonomous IoT device based on the first device profile;
determine a second exposure score for the second autonomous IoT device based on the second device profile;
determine whether the first exposure score and the second exposure score are within a predetermined authorization threshold level; and
determine that the first autonomous IoT device is authorized to execute the transaction with the second autonomous IoT device based on at least determining that the first exposure score and the second exposure score are within a predetermined threshold level.

9. The system of claim 8, wherein the first device profile comprises at least available funds associated with the first autonomous IoT device, one or more financial accounts associated with the first autonomous IoT device, one or more entities associated with the first autonomous IoT device, activity history associated with the first autonomous IoT device, payment history associated with the first autonomous IoT device, security characteristics associated with the first autonomous IoT device, activity characteristics associated with the first autonomous IoT device, device characteristics associated with the first autonomous IoT device, authentication and user information associated with the first autonomous IoT device, and connectivity information associated with the first autonomous IoT device.

10. The system of claim 8, wherein the second device profile comprises at least available funds associated with the second autonomous IoT device, one or more financial accounts associated with the second autonomous IoT device, one or more entities associated with the second autonomous IoT device, activity history associated with the second autonomous IoT device, payment history associated with the second autonomous IoT device, security characteristics associated with the second autonomous IoT device, activity characteristics associated with the second autonomous IoT device, device characteristics associated with the second autonomous IoT device, authentication and user information associated with the second autonomous IoT device, and connectivity information associated with the second autonomous IoT device.

11. The system of claim 1, wherein the at least one processing device is further configured to:
determine that the first autonomous IoT device is not authorized to execute the transaction with the second autonomous IoT device; and transmit instructions to the first autonomous IoT device, wherein the instructions comprise a denial of authorization to execute the transaction;
receive, from the first autonomous IoT device, an indication that the transaction has been aborted.

12. A computer implemented method for machine learning based system for authorization of autonomous resource transfers between distributed IoT components, the method comprising:
receiving, from a first autonomous IoT device, a transaction authorization request to execute a transaction with a second autonomous IoT device;
initiating a policy and compliance engine for autonomous transactions to perform a compliance evaluation on the transaction in response to receiving the transaction authorization request;
determining that the transaction has passed the compliance evaluation;
receiving information associated with the first autonomous IoT device, information associated with the second autonomous IoT device, and information associated with the transaction;
initiating an execution of one or more machine learning algorithms on the information associated with the first autonomous IoT device, the information associated with the second autonomous IoT device, and the information associated with the transaction;
determining that the first autonomous IoT device is authorized to execute the transaction with the second autonomous IoT device based on at least the execution of one or more machine learning algorithms and determining that the transaction has passed the compliance evaluation;
transmitting a transaction authorization to the first autonomous IoT device to execute the transaction; and
receiving, from the first autonomous IoT device, an indication that the transaction has been executed.

13. The computer implemented method of claim 12, wherein the information associated with the first autonomous IoT device comprises at least a device security profile, a device profile, historical IoT claims, exposure data, alert data, one or more accounts associated with the first autonomous IoT device, one or more authorization profiles associated with the one or more accounts, settings associated with the one or more accounts, and exposure patterns.

14. The computer implemented method of claim 12, wherein the information associated with the second autonomous IoT device comprises at least a device security profile, a device profile, historical IoT claims, exposure data, alert data, one or more accounts associated with the second autonomous IoT device, one or more authorization profiles associated with the one or more accounts, settings associated with the one or more accounts, and exposure patterns.

15. The computer implemented method of claim 12, wherein the method further comprises:
determining one or more constraints associated with the transaction based on at least the execution of the one or more machine learning algorithms on the information associated with the first autonomous IoT device, the information associated with the second autonomous IoT device, and the information associated with the transaction; and
determining that the first autonomous IoT device is authorized to execute the transaction with the second autonomous IoT device within the one or more constraints.

16. The computer implemented method of claim 15, wherein the method further comprises:

receiving, from the first autonomous IoT device, an indication that at least one of the first autonomous IoT device and/or the second autonomous IoT device does not satisfy the one or more constraints;

determining one or more additional information required to execute the transaction without the one or more constraints;

transmitting a request to the first autonomous IoT device and/or the second autonomous IoT device to provide the one or more additional information required to execute the transaction without the one or more constraints;

receiving, from the first autonomous IoT device and/or the second autonomous IoT device, the one or more additional information required to execute the transaction without the one or more constraints;

determining that the one or more additional information provided by the first autonomous IoT device and/or the second autonomous IoT device is sufficient to remove the one or more constraints; and transmitting the transaction authorization to the first autonomous IoT device to execute the transaction without the one or more constraints.

17. The computer implemented method of claim 12, wherein the method further comprises:

receiving, from the first autonomous IoT device, an indication that one or more resources associated with the transaction were not delivered in response to the execution of the transaction;

transmitting a request to the first autonomous IoT device to provide one or more additional information associated with the transaction;

receiving, from the first autonomous IoT device, the one or more additional information associated with the transaction;

determining one or more actions to be performed by at least the first autonomous IoT device or the second autonomous IoT device based on at least receiving the one or more additional information associated with the transaction;

transmitting the one or more actions to the first autonomous IoT device and the second autonomous IoT device; and initiating an execution of the one or more actions on the first autonomous IoT device and the second autonomous IoT device.

18. A computer program product for a machine learning based system for authorization of autonomous resource transfers between distributed IoT components, the computer program product comprising a non-transitory computer-readable medium comprising code causing a first apparatus to:

receive, from a first autonomous IoT device, a transaction authorization request to execute a transaction with a second autonomous IoT device;

initiate a policy and compliance engine for autonomous transactions to perform a compliance evaluation on the transaction in response to receiving the transaction authorization request;

determine that the transaction has passed the compliance evaluation;

receive information associated with the first autonomous IoT device, information associated with the second autonomous IoT device, and information associated with the transaction;

initiate an execution of one or more machine learning algorithms on the information associated with the first autonomous IoT device, the information associated with the second autonomous IoT device, and the information associated with the transaction;

determine that the first autonomous IoT device is authorized to execute the transaction with the second autonomous IoT device based on at least the execution of one or more machine learning algorithms and determining that the transaction has passed the compliance evaluation;

transmit a transaction authorization to the first autonomous IoT device to execute the transaction; and receive, from the first autonomous IoT device, an indication that the transaction has been executed.

* * * * *